Oct. 25, 1966  JEAN-PIERRE GAY  3,280,548
CHECK PATTERN CHAIN
Filed June 5, 1964
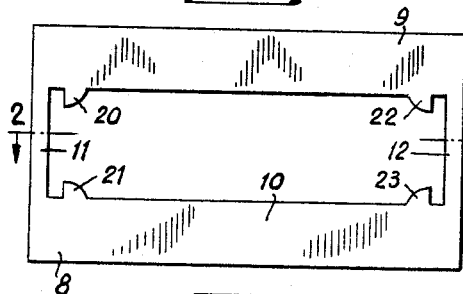
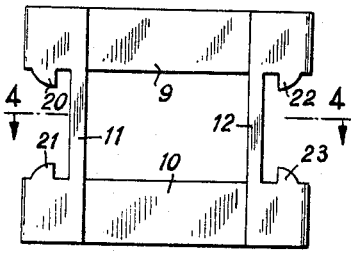
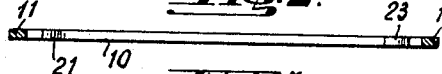
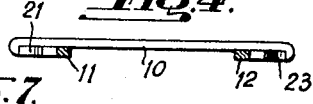
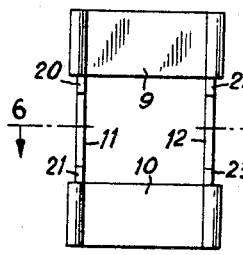
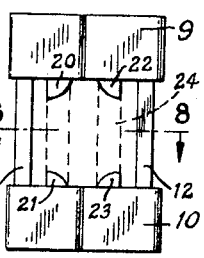
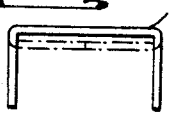
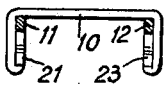
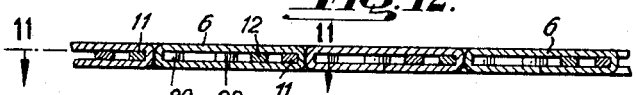
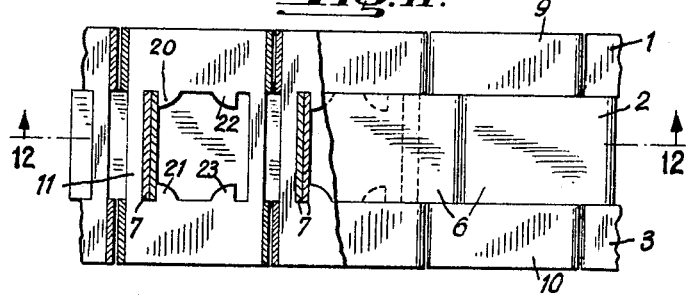
INVENTOR
JEAN-PIERRE GAY
By Irwin S. Thompson
ATTY.

United States Patent Office 3,280,548
Patented Oct. 25, 1966

3,280,548
CHECK PATTERN CHAIN
Jean-Pierre Gay, Geneva, Switzerland, assignor to Gay Freres S.A., Geneva, Switzerland, a joint-stock company of Switzerland
Filed June 5, 1964, Ser. No. 372,769
Claims priority, application Switzerland, July 18, 1963, 8,990/63
6 Claims. (Cl. 59—84)

U.S.A. Patent No. 3,046,726 relates to a check pattern chain, which may serve to make up a bracelet or a collar for example and which is formed of hinged links of general rectangular shape. This chain is characterized in that it comprises a set of elements each formed of a rectangular metallic frame of which two opposite edges have been folded on themselves, each of these elements extending over the whole width of the chain, with their parts thus folded disposed transversely relative to the length of the chain, and each forming, on the one hand, at least two links of a first kind and, on the other hand, through parts of their transverse sides, at least a pair of joining arms rigidly connecting these links one with the other, and in that it comprises a set of links of a second kind, each joining together two of these connecting arms belonging to two successive elements, these arms forming pivots for the links of the second kind.

The present invention has for object an improvement in the chain described in the main patent; it relates to a check pattern chain, formed of hinged links of general rectangular shape, comprising a set of elements each formed of a rectangular metallic frame of which two opposite edges have been folded on themselves, each of these elements extending over the whole width of the chain, with their parts thus folded disposed transversely relative to the length of the chain, and each forming, on the one hand, at least two links of a first kind and, on the other hand, through parts of their transverse sides, at least a pair of main joining arms rigidly connecting these links one with the other, and also comprising a set of links of a second kind, each joining together two successive elements. The chain according to the present invention is characterized in that each element is provided with at least a pair of flat lugs, each of two links of the said first kind being provided with a lug of the pair, or a flat auxiliary arm connecting these links of the first kind between the said principal arms, this pair of flat lugs or this flat auxiliary arm being adjacent to one of the main arms, and in that the said links of the second kind join together two successive elements on the one hand by one of the main joining arms of an element and on the other hand by a pair of flat lugs or a flat auxiliary arm of the following element, this latter principal arm forming a pivot for the links of the second kind, and this latter pair of flat lugs or this latter flat auxiliary arm preventing the pivoting of the said links of the second kind.

The accompanying drawing shows, by way of example, one embodiment of the chain object of the invention, in the case where it forms a bracelet.

FIG. 1 is a plan view of an element of the bracelet before shaping.

FIG. 2 is a view in section along line 2—2 of FIG. 1.

FIGS. 3, 5 and 7 are views similar to FIG. 1 showing the element in three successive stages of the shaping.

FIGS. 4, 6 and 8 are respectively views in section along 4—4 of FIG. 3, 6—6 of FIG. 5 and 8—8 of FIG. 7.

FIG. 9 is a view in plan of a link of the second kind of the bracelet before shaping.

FIG. 10 is a side view of the link of the second kind of the bracelet shown in FIG. 9.

FIG. 11 is a plan view of a section of the bracelet, partly cut away along 11—11 of FIG. 12.

FIG. 12 is a view in longitudinal section of the bracelet 12—12 of FIG. 11.

The bracelet shown in FIGS. 11 and 12 is formed of three rows of links, 1, 2 and 3, all of them having a general rectangular shape. These links are connected by hinges, as will be described hereafter.

The rows 1 and 3 are formed by means of a set of elements obtained as will be described with reference to FIGS. 1 to 8.

As regards row 2, it is formed of simpler elements, which are seen at 6 in FIG. 12 and each of which is obtained from a part 7 such as shown in FIGS. 9 and 10.

To produce the elements forming the rows 1 and 3, one starts with a part forming a rectangular metallic frame 8 having two longitudinal edges 9, 10 of the same width and two narrower transverse edges 11, 12. The edges 9, 10 are provided, in this example, with two pairs of flat lugs 20, 21 and 22, 23, each pair being adjacent to a transverse edge 11 and 12 respectively.

The finished element is visible in FIGS. 7 and 8 and, in order to obtain the same, one proceeds in the following manner:

One begins by folding on themselves, a first time through 180°, the opposite transverse edges 11 and 12, as is seen in FIGS. 3 and 4. Then, one further folds these edges through 90°, as shown in FIGS. 5 and 6, then one continues to fold up to 180° to bring the transverse edges 11 and 12 of the original frame into the position twice folded on themselves which is shown in FIGS. 7 and 8.

The elements shown in FIGS. 7 and 8 extend over the whole width of the bracelet, as is shown in FIG. 10. The folded parts extend transversely relative to the length of the bracelet. As regards the edges 9 and 10, they form two links 1 and 3 of a first kind. The sides 11 and 12 of the original frame form main joining arms rigidly connecting these links 1 and 3 one with the other.

These different elements according to FIGS. 7 and 8, disposed parallel one to the other, are connected two by two by links of a second kind, 6. It is these links 6 which form, as has been seen, the row 2. In order to place these links 6, one takes U-shaped elements 7 (FIG. 10), one places them astride the main arm 11 of a link and the pair of flat lugs 20, 21 of the adjacent link, and one folds them to give them the shape visible in FIG. 12. Once thus placed, each of these links 6 of the second kind joins together the main joining arm 11 and the pair of flat lugs 20, 21 of the following element, these arms 11 forming pivoting hinges for the links 2, and a pair of flat lugs 20, 21 preventing the links 2 from pivoting.

Thus, the two links 1 and 3 of the link 2 between them remain practically fixed relative to one another and form a rigid unit. This latter may, on the other hand, pivot with respect to the following unit, also formed of two links 1 and 3 and a link 2.

It will be seen that in the example described, the arms 12 and the pairs of lugs 22, 23 of the elements are not utilized, and that the links 6 of the second kind are offset asymmetrically relative to the links 9, 10 of the first kind. It is obvious that the links 6 could be hinged to the main arm 12 of an element and to the pair of lugs 22, 23 of the following element. One would then obtain the same chain as the one described, with the only difference that the links 6 would be off-set to the left and not to the right as is seen in FIG. 11.

The fact of providing two pairs of symmetrical flat lugs 20, 21 and 22, 23 per element permits of disposing the elements before mounting the chain without taking into account the position of the lugs. If there were only one pair of lugs per element, either the pair 20, 21 or the pair 22, 23, which is fundamentally possible, it would be necessary previously to dispose each element, before mounting, with the lugs disposed on the same side.

Although in the example described a single pair of flat lugs (20, 21 or 22, 23) is employed, there is therefore an advantage in providing two pairs of lugs disposed symmetrically, since the mounting of the chain is thus greatly facilitated.

One could vary the degree of off-setting of the links 6 by a more or less asymmetrical arrangement of the main arm 11 and of its adjacent pair of lugs 20, 21 relative to the main arm 12 and its adjacent pair of lugs 22, 23 or vice versa, but such an asymmetrical arrangement would complicate the manufacture of the elements.

Finally, one could also replace a pair of flat lugs 20, 21 and 22, 23 respectively by auxiliary flat joining arms 24, connecting the branches 9 and 10 between the main arms 11 and 12.

In a modified form corresponding to the case in which the chain would have five rows of links, a middle branch would be disposed between the branches 9 and 10. Similarly, if one desires a chain of seven rows of links, one will provide two intermediate branches which will form two intermediate rows of links of the first kind. There will then be in all four rows of links of the first kind and three rows of links of the second kind.

In another modified form, the folding over could stop at the stage shown in FIGS. 3 and 4.

What I claim is:

1. A check pattern chain, formed of hinged links of general rectangular shape, comprising a set of elements each formed of a rectangular metallic frame of which two opposite edges have been folded on themselves, each of these elements extending over the whole width of the chain, with their parts thus folded disposed transversely relative to the length of the chain, and each forming, on the one hand, at least two links of a first kind and, on the other hand, through parts of their transverse sides, at least a pair of main joining arms rigidly connecting these links one with the other, and also comprising a set of links of a second kind, each joining together two successive elements, characterized in that each element is provided with at least one pair of flat lugs, each of two links of the said first kind being provided with a lug of the pair, this pair of flat lugs being adjacent to one of the main arms, and in that the said links of the second kind join together two successive elements on the one hand by one of the main joining arms of an element and on the other hand by a pair of flat lugs, this latter main arm forming a pivot for the links of the second kind, and this latter pair of flat lugs preventing the pivoting of the said links of the second kind.

2. A chain according to claim 1, characterized in that the links of the second kind are off-set asymmetrically relative to the links of the first kind.

3. A chain according to claim 1, characterized in that each element is provided with a single pair of flat lugs.

4. A chain according to claim 1, characterized in that each element is provided with two pairs of flat lugs disposed symmetrically in this element, one only of these two pairs of flat lugs serving to hold the links of the second kind.

5. A check pattern chain, formed of hinged links of general rectangular shape, comprising a set of elements each formed of a rectangular metallic frame of which two opposite edges have been folded on themselves, each of these elements extending over the whole width of the chain, with their parts thus folded disposed transversely relative to the length of the chain, and each forming, on the one hand, at least two links of a first kind and, on the other hand, through parts of their transverse sides, at least a pair of main joining arms rigidly connecting these links one with the other, and also comprising a set of links of a second kind, each joining together two successive elements, characterized in that each element is provided with a flat auxiliary arm connecting these links of the first kind between the said main arms, said flat auxiliary arm being adjacent to one of the main arms, and in that the said links of the second kind join together two successive elements on the one hand by one of the main joining arms of an element and on the other hand by a said flat auxiliary arm of the following element, this latter main arm forming a pivot for the links of the second kind, and this latter flat auxiliary arm preventing the pivoting of the said links of the second kind.

6. A chain according to claim 5, characterized in that the links of the second kind are offset asymmetrically relative to the links of the first kind.

References Cited by the Examiner

UNITED STATES PATENTS

| 1,835,359 | 12/1931 | Warner | 59—91 |
| 2,480,015 | 8/1949 | Goode | 59—91 |
| 3,046,726 | 7/1962 | Gay | 59—80 |

CHARLES W. LANHAM, *Primary Examiner.*

G. P. CROSBY, *Assistant Examiner.*